(12) United States Patent
Moreton

(10) Patent No.: US 8,605,085 B1
(45) Date of Patent: Dec. 10, 2013

(54) SYSTEM AND METHOD FOR PERSPECTIVE CORRECTED TESSELLATION USING PARAMETER SPACE WARPING

(75) Inventor: Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1091 days.

(21) Appl. No.: 12/580,092

(22) Filed: Oct. 15, 2009

(51) Int. Cl.
*G06T 15/30* (2011.01)
*G06T 17/20* (2006.01)

(52) U.S. Cl.
USPC ............................ 345/423; 345/419; 345/420

(58) Field of Classification Search
None
See application file for complete search history.

(56) References Cited

U.S. PATENT DOCUMENTS

| | | | |
|---|---|---|---|
| 5,864,342 A * | 1/1999 | Kajiya et al. | 345/418 |
| 6,542,157 B1 * | 4/2003 | Browne | 345/441 |
| 7,440,879 B2 * | 10/2008 | Breitfeld et al. | 703/6 |
| 2002/0176635 A1 * | 11/2002 | Aliaga et al. | 382/284 |
| 2004/0184013 A1 * | 9/2004 | Raskar et al. | 353/121 |
| 2006/0094951 A1 * | 5/2006 | Dean et al. | 600/407 |

OTHER PUBLICATIONS

Munkberg, et al. "Non-Uniform Fractional Tessellation," Graphics Hardware, The Eurographics Association, 2008.
Munkberg, et al. "Non-Uniform Fractional Tessellation," Slides from Lund University, 2008.

* cited by examiner

*Primary Examiner* — Said Broome
(74) *Attorney, Agent, or Firm* — Patterson & Sheridan, LLP

(57) ABSTRACT

One embodiment of the present invention sets forth a technique for warping uniformly generated barycentric parameters to compensate for perspective foreshortening during tessellation of a geometric object. Near and far step sizes are computed for each edge of the geometric object. A warp equation is associated with each edge. Coefficients for each warp equation are computed from near and far step size for a corresponding edge. Uniformly generated barycentric parameters for each edge comprise an input variable for each corresponding warp equation. Warp equation outputs for edges of the geometric object are blended together using a linear blend function to generate vertices comprising geometric tessellation samples from the geometric object.

17 Claims, 10 Drawing Sheets

SYSTEM AND METHOD FOR PERSPECTIVE CORRECTED TESSELLATION USING PARAMETER SPACE WARPING

BACKGROUND OF THE INVENTION

1. Field of the Invention

The present invention generally relates to geometric processing in graphics systems and more specifically to a system and method for perspective corrected tessellation using parameter space warping.

2. Description of the Related Art

Modern three-dimensional (3D) graphics systems are typically configured to generate one or more graphics images from one or more graphics scenes, with each graphics scene comprising one or more geometric models. The one or more graphics images are then displayed or stored for display later. Each geometric model may include geometric objects such as triangles, meshes, parametric patches, or other types of constructs useful in rendering a graphics scene. Certain geometric objects are tessellated into a mesh of smaller objects for rendering in finer geometric detail. Conventional tessellation is typically performed for a given geometric object in a parametric space with uniform world-space sampling.

In general, uniform world-space sampling produces uneven screen-space sampling, which appears as an uneven distribution of tessellation detail in a rendered image. When a geometric object is rendered in a perspective that produces severe foreshortening, the uniform world-space sampling produces severely uneven screen-space sampling, which appears as very dense tessellation at depth, and very sparse tessellation close to the viewer. Very dense tessellation can create unproductive workload for a 3D graphics system, while very sparse tessellation degrades overall image quality of the one or more graphics images.

Accordingly, what is needed in the art is a system and method for improving overall image quality of tessellated objects in a 3D graphics system.

SUMMARY OF THE INVENTION

One embodiment of the present invention sets forth a computer-implemented method for modifying parameters to account for perspective foreshortening in tessellation operations. The method includes the steps of receiving a plurality of control points that define a geometric object having a plurality of edges, for each edge of the geometric object, computing a near target step size and a far target step size, and, for each edge of the geometric object, formulating a warp function based on the near target step size and the far target step size associated with the edge. The method also includes the steps of receiving a set of barycentric parameters defining a first point within the geometric object in world-space, for each edge of the geometric object, computing a set of warped barycentric parameters for the set of barycentric parameters based on the warp function associated with the edge, and blending the sets of warped barycentric parameters to produce a set of parameters that defines a sample vertex within the geometric object in screen-space.

One advantage of the disclosed method is that greater rendering efficiency is achieved with respect to a tessellated geometric object by better controlling computational effort relative to screen-space detail. Consequently, overall image quality may be increased for a given amount of computational effort.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
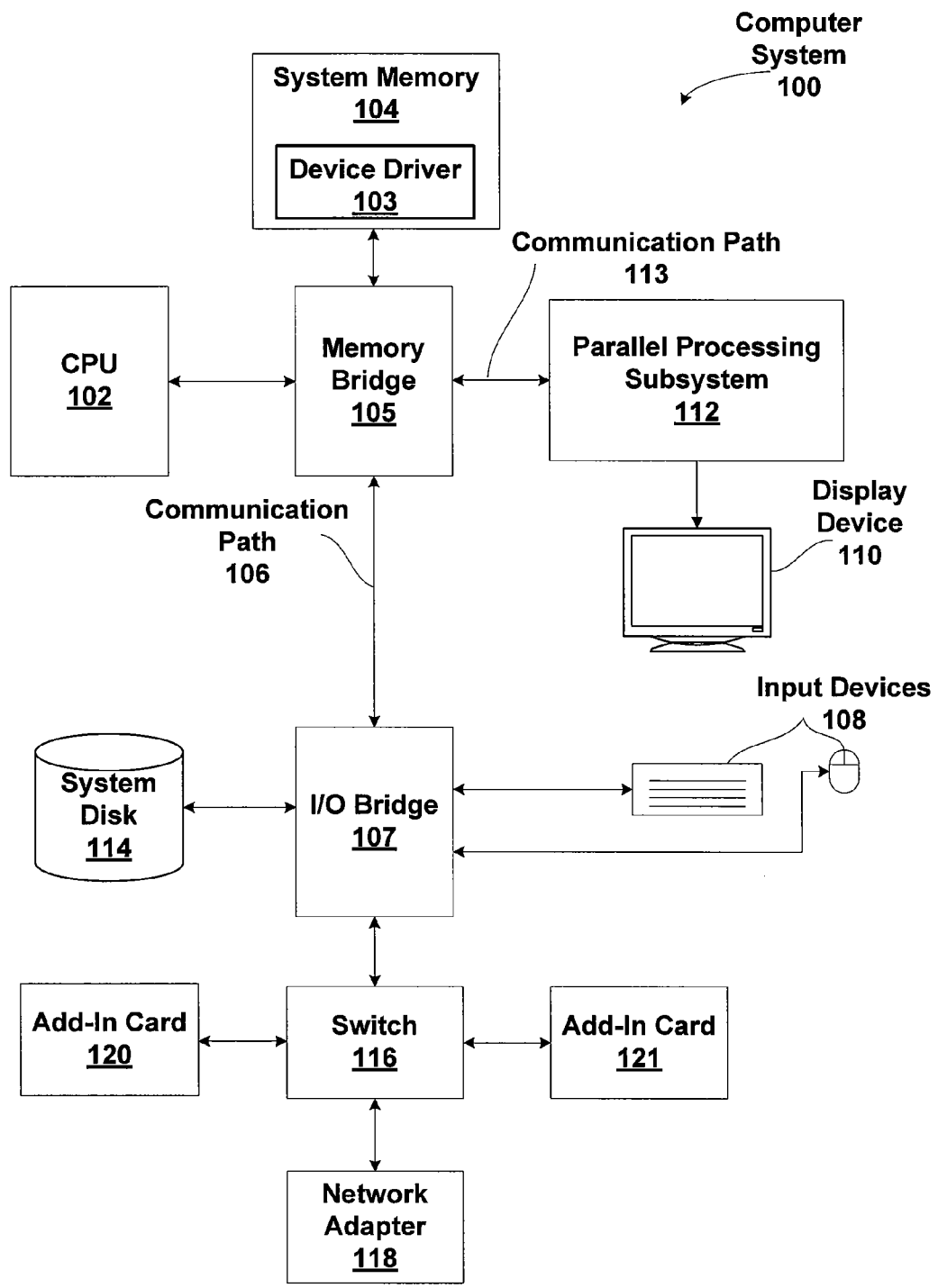
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
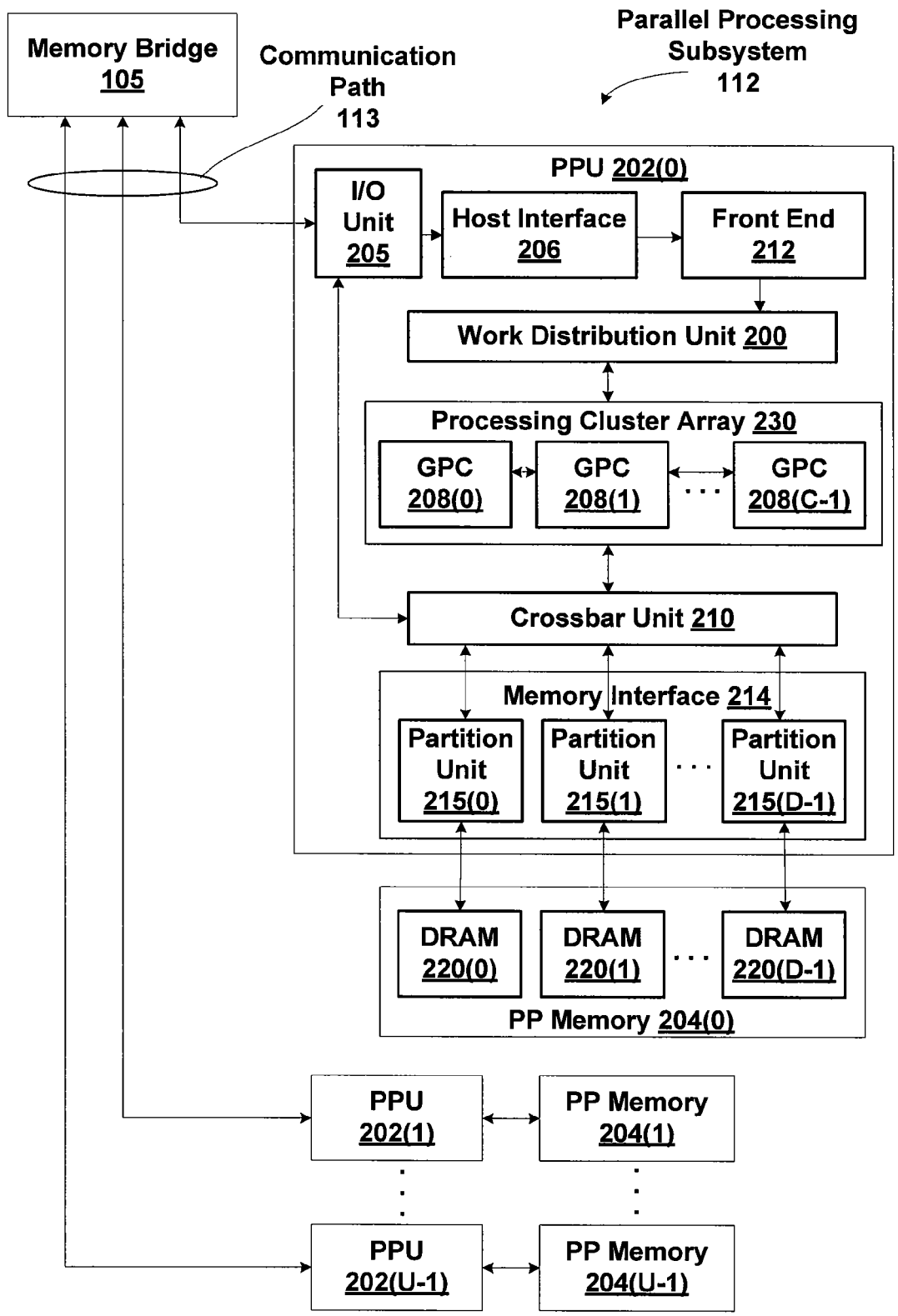
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
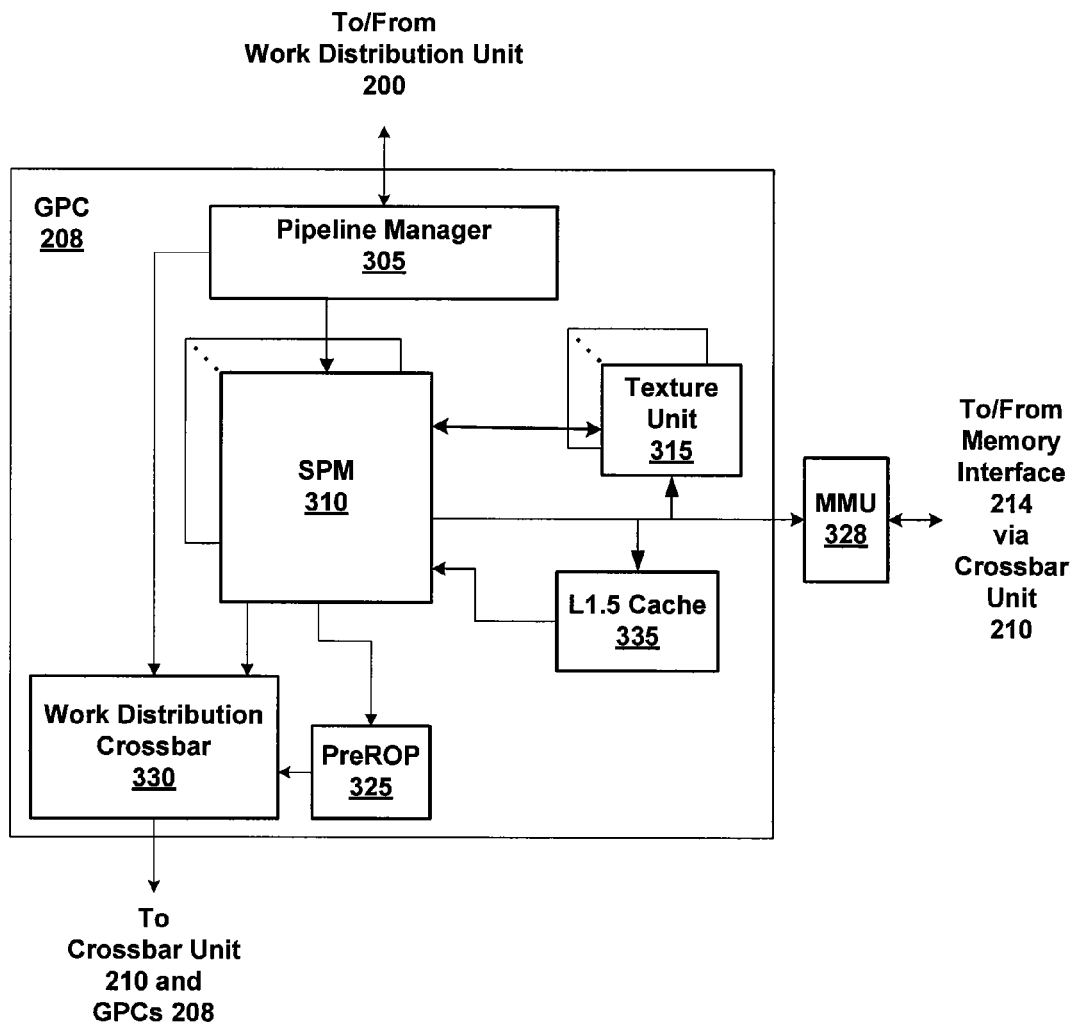
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time. Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
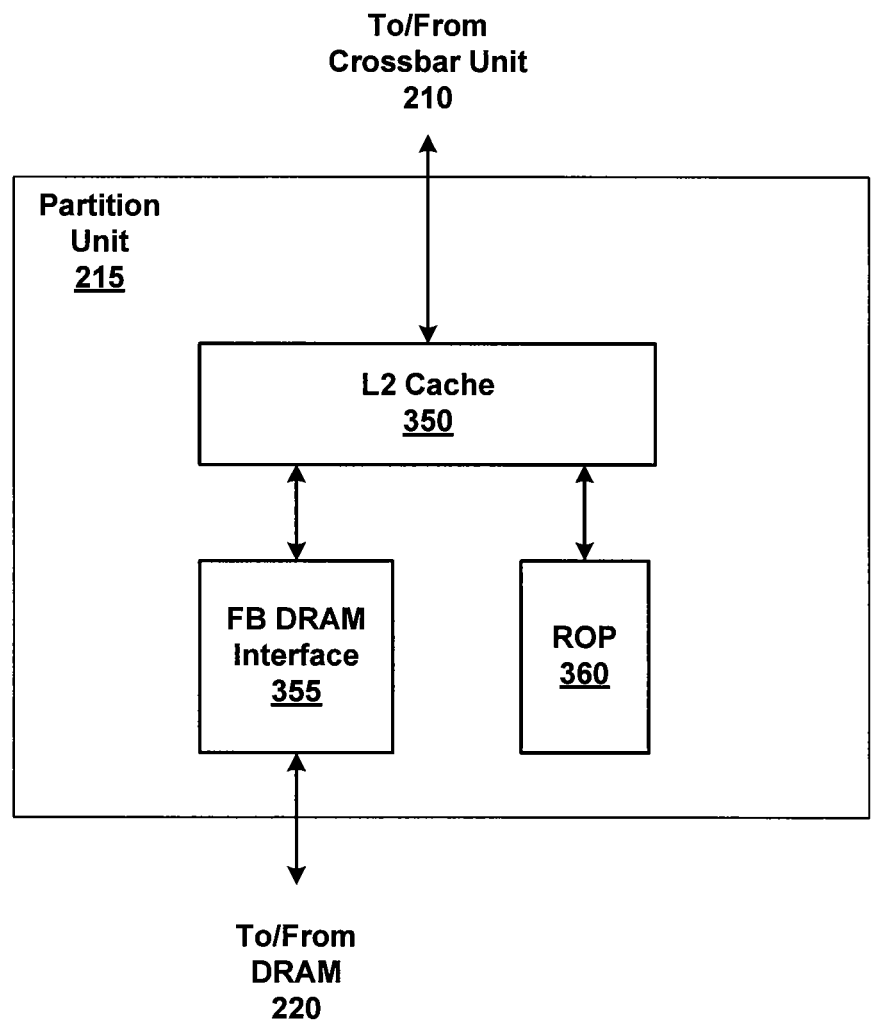
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
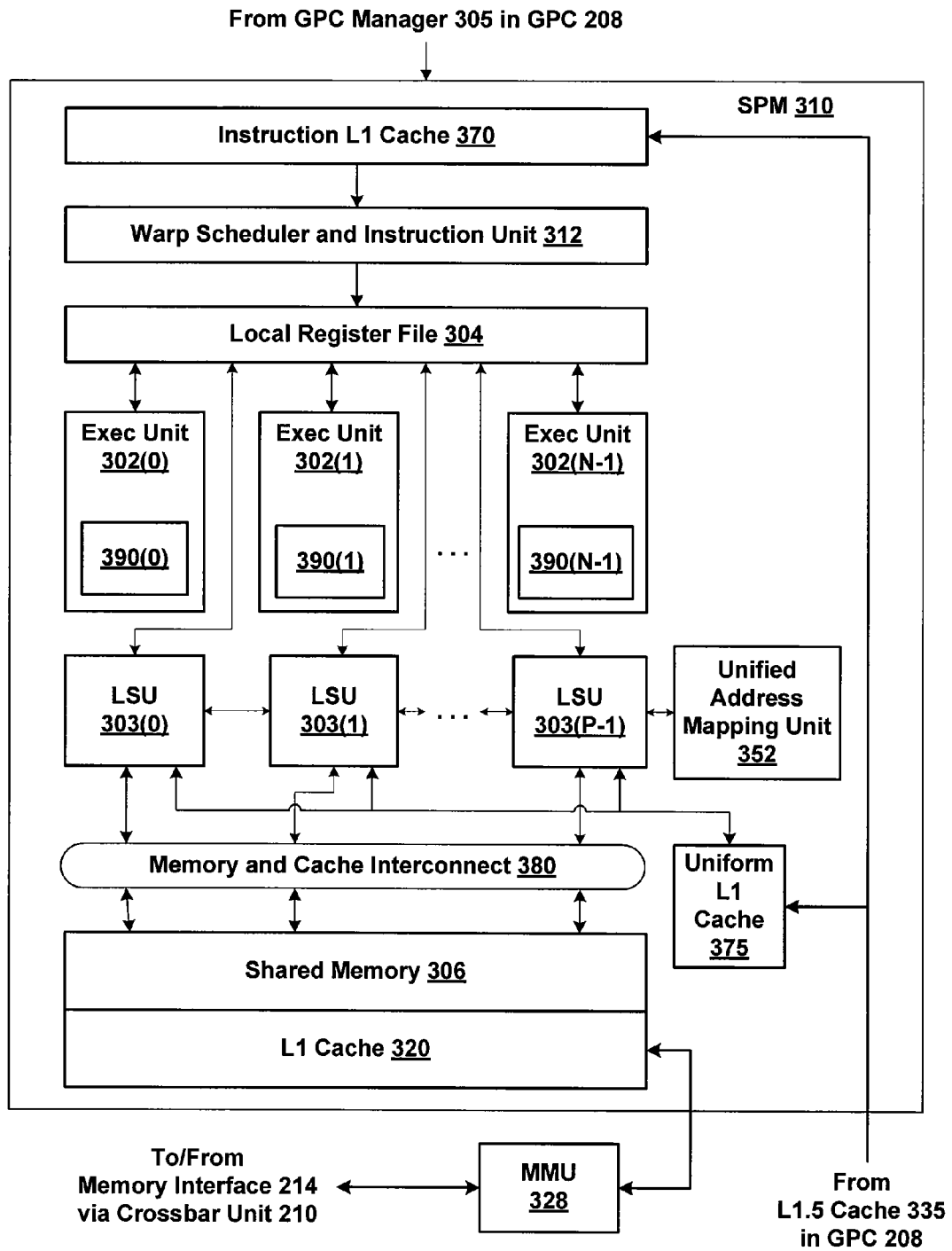
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Graphics Pipeline Architecture

Figure 4:
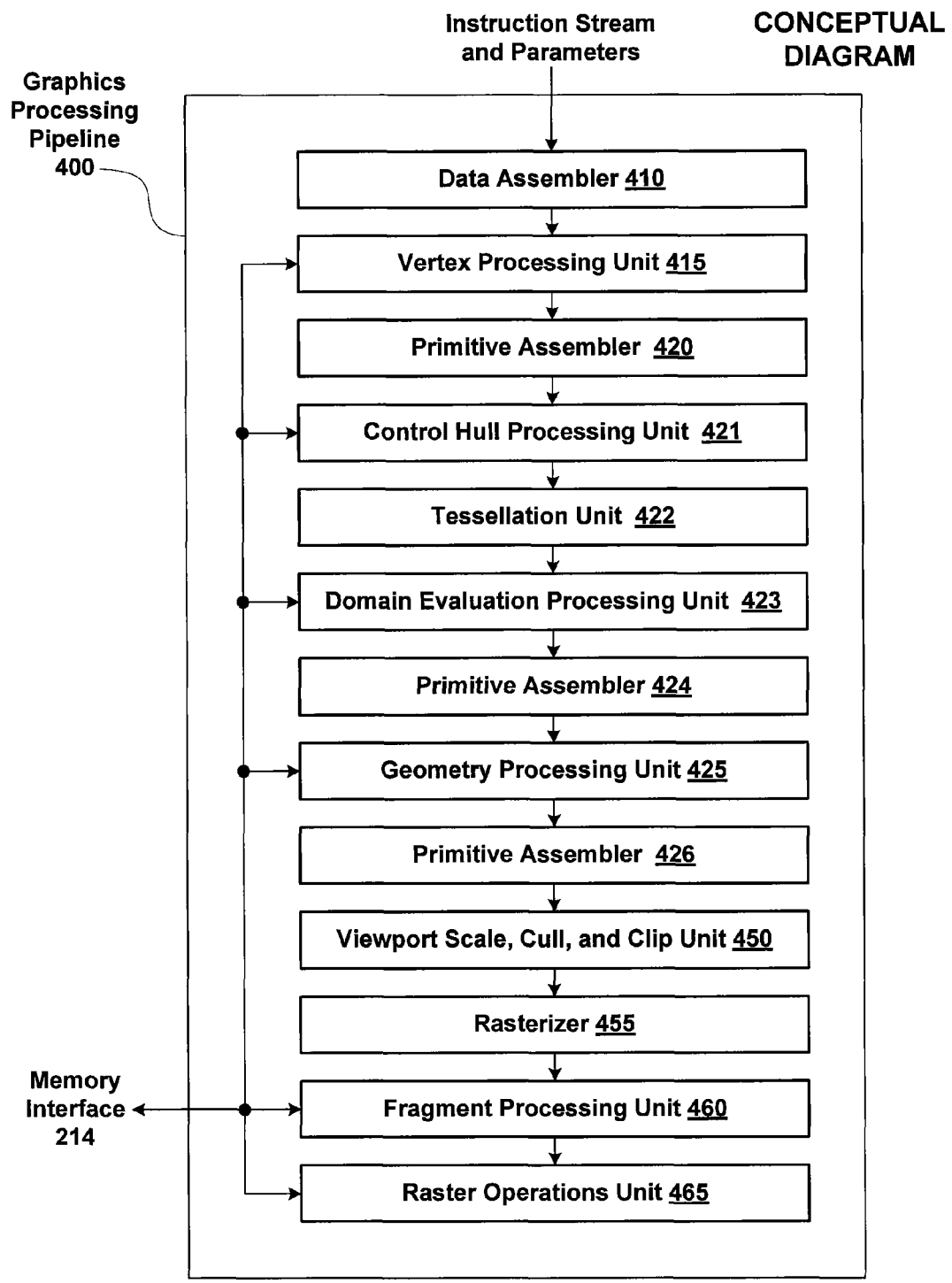
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world-space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by control hull processing unit 421. Graphics primitives include triangles, line segments, points, and the like.

The control hull processing unit 421 transforms control points for a geometric patch from a basis representation to an application representation for tessellation. The control hull processing unit 421 also computes tessellation factors for edges of geometric patches. A tessellation factor applies to a single edge and quantifies a view-dependent level of detail associated with the edge. A tessellation unit 422 is configured to receive the tessellation factors for edges of a patch and to tessellate the patch into multiple geometric primitives such as triangle or quad primitives, which are transmitted to a domain evaluation processing unit 423. The domain evaluation processing unit 423 operates on parameterized coordinates for a geometric primitive to generate a surface representation and vertex attributes for each vertex associated with the geometric primitive.

Primitive assembler 424 receives vertex attributes from domain evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Perspective Corrected Tessellation

Figure 5A:
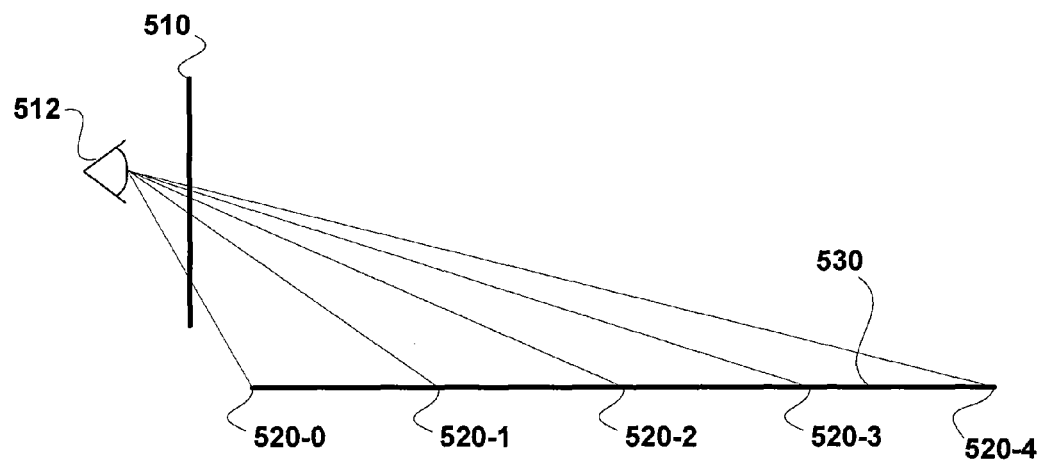
FIG. 5A illustrates a geometric object to be rendered in perspective that is uniformly sampled in world-space.

FIG. 5A illustrates an exemplary geometric object 530 that is uniformly sampled in world-space, but is to be rendered in perspective. As shown, the geometric object 530 is rendered with respect to camera position 512 and view port 510, from which a corresponding screen-space is defined.

The geometric object 530 is defined by a geometric domain that may be specified by control points or by any other technically feasible means for conveying geometric information. As is well-known, the geometric object 530 is typically tessellated into smaller geometric objects for finer geometric rendering. Tessellation produces a set of vertices and an associated set of smaller geometric objects that sample and collectively represent the geometric domain of the geometric object 530. For the geometric object 530, sampling is conventionally performed uniformly in world-space and, therefore, uniformly in model-space, along each boundary (edge) of the geometric domain defining the geometric object 530. For example, vertices 520 are computed by splitting a boundary of the geometric object 530 into a set of even spans along the boundary, thereby distributing vertices 520 evenly in world-space. Any technically feasible technique may be used to determine how many spans should comprise a given boundary.

Figure 5B:
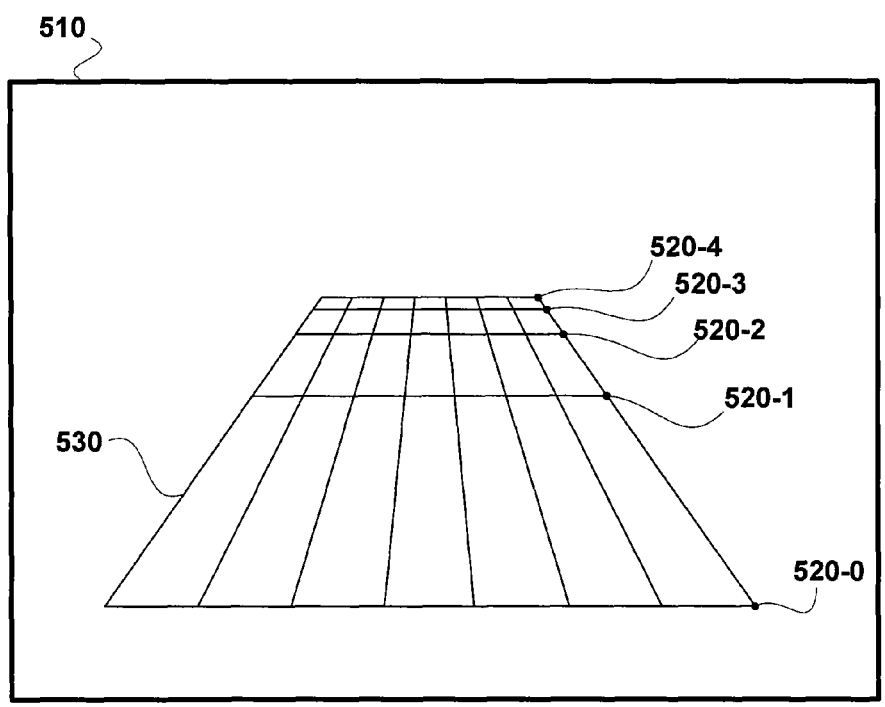
FIG. 5B depicts the geometric object rendered in perspective with resulting foreshortening due to uniform world-space sampling.

FIG. 5B depicts the inner portion of the geometric object 530 rendered in perspective with resulting foreshortening due to uniform world-space sampling. As shown in FIG. 5A, vertices 520 are uniformly distributed in world-space along the boundary of the geometric object 530. However, geometric object 530 is viewed in perspective through view port 510, thereby causing vertices 520 to be distributed unevenly in screen-space. In fact, the deeper the geometric object 530 tilts into perspective, the more unevenly the vertices 520 are distributed in screen-space. This uneven distribution can be observed as a very wide span between vertex 520-0 and vertex 520-1, with progressively smaller spans between more distance vertices 520-2 through 520-4.

As FIG. 5B clearly depicts, as foreshortening increases, the more distant vertices 520-2 through 520-4 become more closely spaced. That is, tessellated geometry associated with vertices 520-0 and 520-1 becomes disproportionately larger than any remaining geometry associated with vertices 520-2 through 520-4. This phenomenon typically results in a loss of image quality for portions of geometric object 530 that are close to camera position 512 and the generation of excessive geometric detail for portions of geometric object 530 that are relatively far from camera position 512. Such outcomes are undesirable. In general, geometric detail on a geometric object that is close to camera position 512 may be tessellated more finely to increase overall image quality. However, generating such fine detail close to camera position 512 tends to result in excessive geometric detail being generated relatively far away from camera position 512, causing a decrease in overall computational efficiency.

Figure 6A:
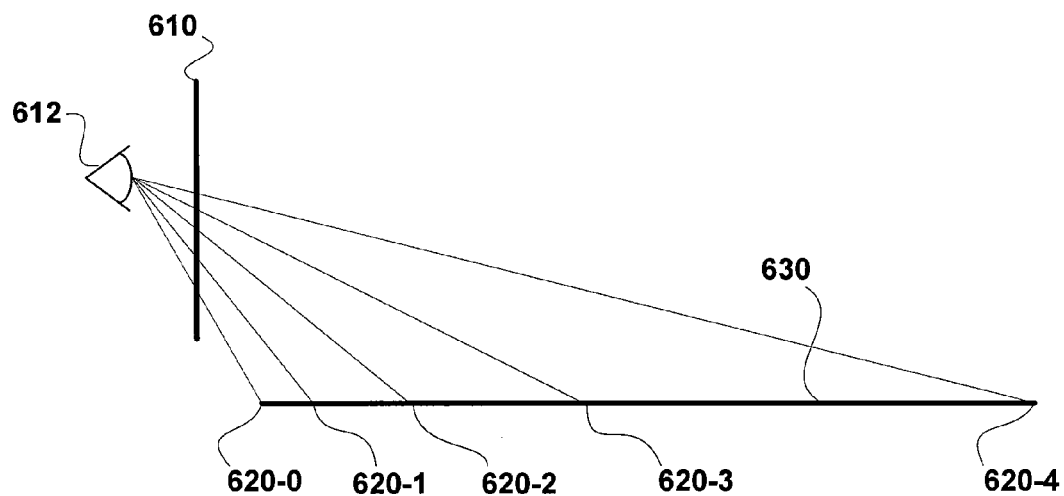
FIG. 6A illustrates a geometric object \ to be rendered in perspective with perspective-corrected geometric sampling, according to one embodiment of the present invention.

FIG. 6A illustrates a geometric object 630 to be rendered in perspective with perspective-corrected geometric sampling, according to one embodiment of the present invention. As shown, the geometric object 630 is rendered with respect to camera position 612 and view port 610, from which a corresponding screen-space is defined.

As with the geometric object 530 of FIGS. 5A and 5B, geometric object 630 is defined by a geometric domain that may be specified by control points or by any other technically feasible means for conveying geometric information. Again, the geometric object 630 is tessellated into smaller geometric objects for finer geometric rendering, and such tessellation produces a set of vertices and an associated set of smaller geometric objects that sample and collectively represent the geometric domain of the geometric object 630. In one embodiment, a sampling function is defined to compensate for perspective while splitting a boundary of the geometric object 630 for sampling. As shown, vertices 620-1 through 620-3 are formed by splitting a boundary of the geometric object 630 into non-uniform spans that project substantially uniformly onto the view port 610.

Figure 6B:
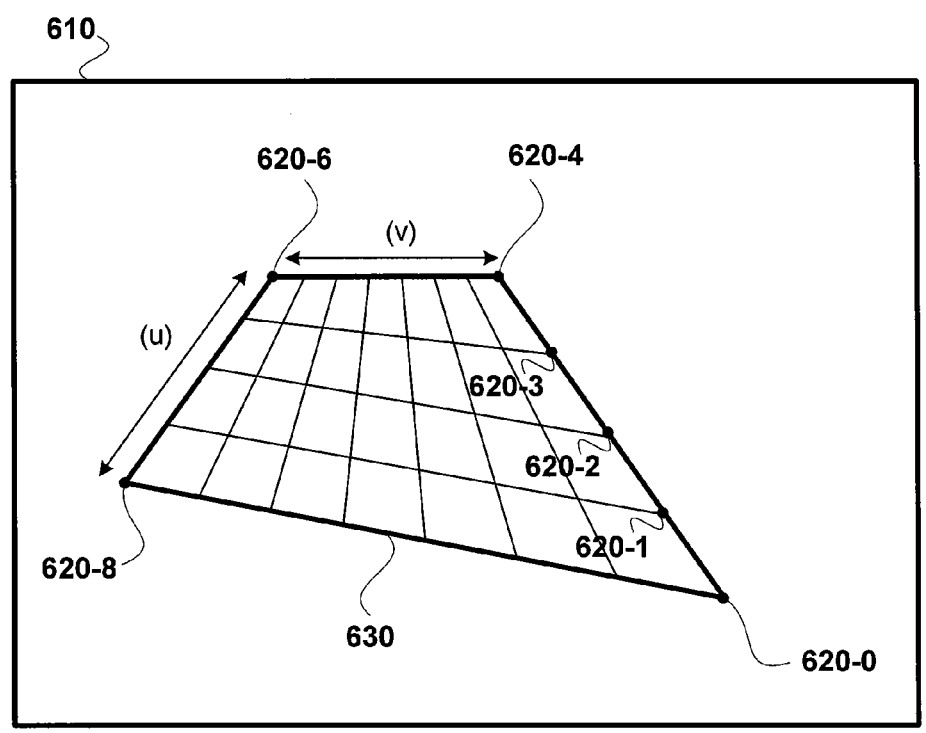
FIG. 6B depicts the geometric object rendered in perspective with perspective-corrected sampling, according to one embodiment of the present invention.

FIG. 6B depicts the geometric object 630 rendered in perspective with perspective-corrected sampling, according to one embodiment of the present invention. As shown, vertices 620-0 through 620-4 are uniformly distributed with respect to each other in screen-space because vertices 620-0 through 620-4 are distributed unevenly in world-space to compensate for perspective.

In one embodiment, the geometric object 630 is a parametric quad patch, defined by four control points associated with vertices 620-0, 620-4, 620-6, and 620-8. In other embodiments, the geometric object may be a triangle, or any other useful geometric construct represented in parametric space. The parametric quad patch includes a first boundary defined by vertices 620-0 and 620-4 and a second boundary defined by vertices 620-6 and 620-8. Persons skilled in the art will understand that the parametric quad patch may be tessellated by splitting (or dividing) each boundary in parametric space and then computing vertices within the geometric domain of the parametric quad patch for each intersection of the resulting boundary split locations. As shown, each resulting boundary may span a different distance in screen-space. As described in greater detail below, embodiments of the present invention compensate for perspective in tessellated geometry by modifying how each boundary of the geometry (here, the geometric object 630) is split (or divided) with respect to barycentric parameters for the geometry.

Figure 7:
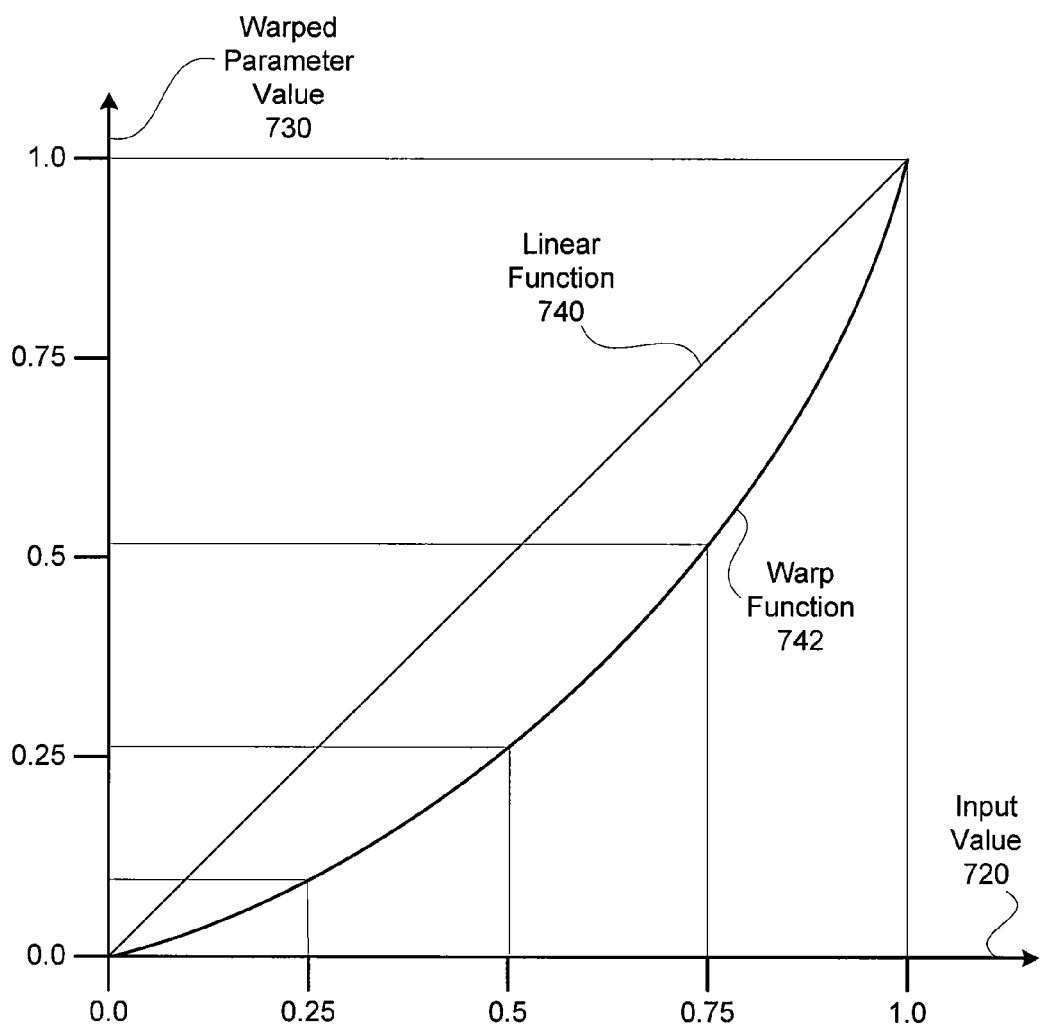
FIG. 7 illustrates a function that maps an input parameter value to a warped parameter value, according to one embodiment of the present invention.

FIG. 7 illustrates a function that maps an input parameter value 720 to a warped parameter value 730, according to one embodiment of the present invention. A linear relationship between the input parameter value 720 and the warped parameter value 730 is shown as a linear function 740. A warp function 742 represents a relationship between the input parameter value 720 and the warped parameter value 730 that compensates for perspective foreshortening of a geometric object rendered to screen-space.

In normal operation, conventionally-generated barycentric parameters for a particular geometry, such as the geometric object 630, comprise a sequence of parameter values, each of which represents an input parameter value 720. Each resulting warped parameter value 730 is then used in place of the corresponding conventionally-generated barycentric parameter value for that geometry. Warp function 742 handles one edge of the geometry. When tessellating a parametric quad patch, the results from multiple warp functions, corresponding to the four respective edges of the quad patch, should be blended, as described below, to determine the warped parameter values for the different boundary split intersections within the quad patch.

In one embodiment, the warp function 742 is a quadratic relationship of the form shown below in Equation 1. The input parameter value 720 corresponds to variable "x," and the warped parameter value 730 corresponds to variable "y."

$$y(x) = ax^2 + bx \qquad \text{(Equation 1)}$$

One approach to solving for constants "a" and "b" involves matching derivatives of Equation 1 at x=0 and x=1 (limits of the input parameter value 740) to a target step size for x=0 and x=1. The target step size may be denoted as variable "A," where the target step size at x=0 is $A_0$, and target step size at x=1 is $A_1$. The target step size defines an appropriate span in parameter space between adjacent vertices at the parameter value, given a prevailing perspective of an associated geometric object. The target step size corresponds to a slope of warp function 742. Persons skilled in the art will recognize that any technically feasible technique may be used to compute target step size.

A first derivative (slope, y') of Equation 1 is shown in Equation 2, below:

$$y'(x) = 2ax + b \qquad \text{(Equation 2)}$$

Given that $A_0$ defines the slope of Equation 1 at x=0 and that Equation 2 expresses the slope of Equation 1 as a function of x, constant "b" is given by Equation 3, below:

$$b = A_0 \qquad \text{(Equation 3)}$$

Given that $A_1$ defines the slope of Equation 1 at x=1, constant "a" is given by Equation 4, below:

$$a = \frac{A_1 - A_0}{2} \qquad \text{(Equation 4)}$$

Equation 5 combines Equations 1, 3 and 4 into a basic quadratic form:

$$y(x) = \frac{A_1 - A_0}{2} x^2 + A_0 x \qquad \text{(Equation 5)}$$

Equation 6 expresses warp function 742 of FIG. 7 as W(x). Equation 6 is a normalized version of Equation 5, such that (x=0, y=0) and (x=1, y=1):

$$y(x) = \left[ \frac{A_1 - A_0}{2} x^2 + A_0 x \right] \bigg/ \left[ \frac{A_1 + A_0}{2} \right] \qquad \text{(Equation 6)}$$

During tessellation, a geometric object boundary is split into "S" steps. In one embodiment, parameter unit 390 of FIG. 3C generates uniformly distributed barycentric parameters corresponding to S steps along the geometric object boundary. The uniformly distributed barycentric parameters are processed according to Equation 6 to generate perspective corrected barycentric parameters that comprise vertices for geometric objects generated during tessellation. In such an embodiment, S combines step sizes at each extreme of the boundary, as illustrated below in Equation 7:

$$S = \frac{1}{A0} + \frac{1}{A1} \qquad \text{(Equation 7)}$$

Again, one type of geometric object that may be tessellated using embodiments of the present invention is a parametric quad patch, which includes four edges. Each edge is parameterized using barycentric parameters, as set forth above in the description of FIG. 7. In one embodiment, a linear function blends results from four warp functions 742. The blended results comprise a set of warped barycentric parameters for the different boundary split intersections within the parametric quad patch that are then used in tessellating the parametric quad patch. The blending of the different warp function 742 is described below.

Equation 8 illustrates a linear blend function to blend $U_0(u)$ and $U_1(u)$. $U_0(u)$ represents the warp function of Equation 6, with constants $A_0$ and $A_1$ computed for one edge of the parametric quad patch. $U_1(u)$ represents the warp function of Equation 6, with constants $A_0$ and $A_1$ computed for an opposite edge of the parametric quad patch. Similarly, Equation 9 illustrates a linear blend function to blend $V_0(v)$ and $V_1(v)$. $V_0(v)$ represents the warp function of Equation 6, with constants $A_0$ and $A_1$ computed for a third (connecting) edge of the parametric quad patch. $V_1(v)$ represents the warp function of Equation 6, with constants $A_0$ and $A_1$ computed for a fourth edge of the parametric quad patch. $U_0(u)$ and $U_1(u)$ are associated with two parallel edges of the parametric quad patch, while $V_0(v)$ and $V_1(v)$ are associated with the other two parallel edges of the parametric quad patch. With Equations 8 and 9, a parametric quad patch may be sampled using P(U(u,v),V(u,v)).

$$U(u,v) = (1-v)U_0(u) + vU_1(u) \qquad \text{(Equation 8)}$$

$$V(u,v) = (1-u)V_0(v) + uV_1(v) \qquad \text{(Equation 9)}$$

Persons skilled in the art will recognize that, in other embodiments, technically feasible blending techniques, other than linear blending, may be implemented. All such blending techniques fall within the scope of the present invention.

Figure 8:
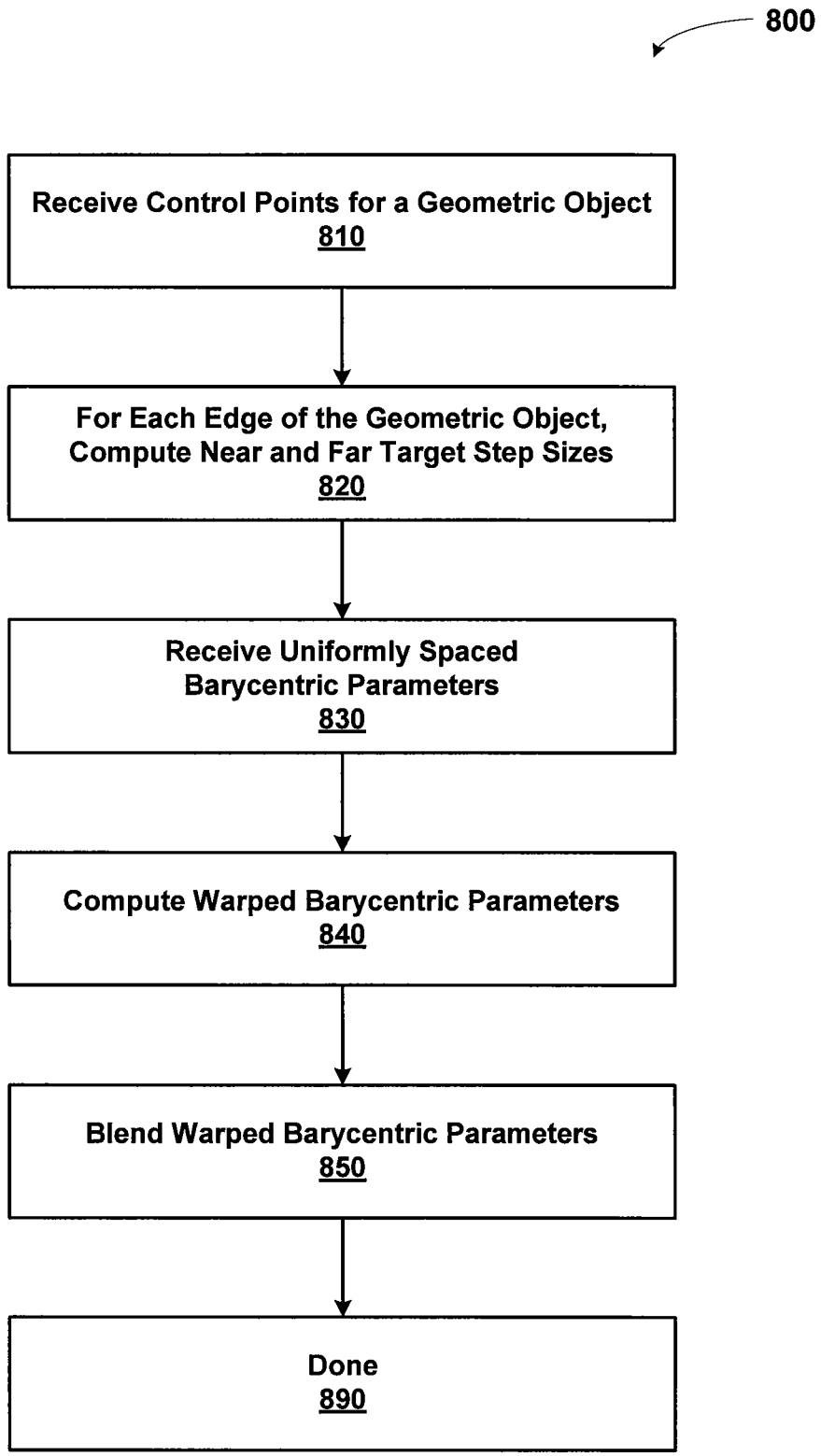
FIG. 8 is a flow diagram of method steps for warping barycentric parameters to account for perspective foreshortening, according to one embodiment of the present invention.

FIG. 8 is a flow diagram of method steps 800 for warping barycentric parameters to account for perspective foreshortening, according to one embodiment of the present invention. Although the method steps are described in conjunction with the systems of FIGS. 1-4, persons skilled in the art will understand that any system configured to perform the method steps, in any order, is within the scope of the inventions.

The method begins is step 810, where control points for a geometric object are received by a hull shader program executing on an SPM 310 of FIG. 3C. In the context of the conceptual graphics processing pipeline 400 of FIG. 4, the hull shader executes as part of the control hull processing unit 421. In one embodiment, the geometric object is a parametric quad patch, comprising four edges and four control points.

In step 820, for each edge of the geometric object, the hull shader program computes near and far step sizes for each edge of the parametric quad patch, corresponding to coefficients $A_0$ and $A_1$, described above. Coefficients $A_0$ and $A_1$ may be computed using any technically feasible technique. In step 830, a domain shader program receives uniformly spaced barycentric parameters from the parameter unit 390 of FIG. 3C. In the context of the conceptual graphics processing pipeline 400, the domain shader program executes as part of the domain evaluation processing unit 423 and receives the uniformly spaced barycentric parameters from the tessellation unit 422.

In step 840, the domain shader program computes warped barycentric parameters from the uniformly spaced barycentric parameters. In an embodiment where the geometric object is a parametric quad patch with four corresponding uniformly spaced barycentric parameters, the four uniformly spaced barycentric parameters comprise inputs to Equation 6, used to compute four warped barycentric parameters. In step 850, the domain shader program blends the four warped barycentric parameters using Equations 8 and 9, or any other technically feasible blending technique, to generate a location of a sample vertex on the geometric object. The method terminates in step 890. Steps 830 through 850 are repeated for each step along each edge of the parametric quad patch to produce a set of vertices for generating subpolygons for the tessellation operation that appear more evenly spaced relative to another in screen-space.

In alternative embodiments, functions associated with steps 840 and 850 may be implemented using logic circuits and operate conceptually within the tessellation unit 422.

Persons skilled in the art will understand that embodiments of the present invention may be embedded in an existing graphics rendering pipeline to improve visual quality of rendered images that include tessellated objects viewed with perspective foreshortening. Further, embodiments of the invention may be implemented any time a geometric object is divided evenly in world-space to produce a uniform grid of vertices for generating subpolygons for a tessellation operation. Thus, embodiments of the invention may be implemented in a tessellation operation involving a geometry where the inner part of the geometric object is uniformly tessellated in world-space and the outer parts of the geometric object are stitched.

In sum, a technique for improving tessellation of geometric objects is disclosed. A warp function computes warped barycentric parameters from barycentric parameters generated by a tessellation function within the graphics rendering pipeline. The warp function compensates for perspective foreshortening of tessellated geometry from a geometric object. In one embodiment, the warp function is a quadratic with coefficients computed to reflect a target geometric sampling rate at each extreme of an edge of the geometric object. Four warped barycentric parameters are combined to generate a sample vertex on the geometric object.

One advantage of the techniques described herein is that greater rendering efficiency is achieved with respect to a tessellated geometric object by better controlling computational effort relative to screen-space detail. Consequently, overall image quality may be increased for a given amount of computational effort.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for modifying parameters to account for perspective foreshortening in tessellation operations, the method comprising:
    receiving a plurality of control points that define a geometric object having a plurality of edges;
    for each edge of the geometric object, computing a near target step size and a far target step size;
    for each edge of the geometric object, formulating a warp function based on the near target step size and the far target step size associated with the edge, wherein each warp function comprises a quadratic function;
    receiving a set of barycentric parameters defining a first point within the geometric object in world-space;
    for each edge of the geometric object, computing a set of warped barycentric parameters for the set of barycentric parameters based on the warp function associated with the edge; and
    blending the sets of warped barycentric parameters to produce a set of parameters that defines a sample vertex within the geometric object in screen-space.

2. The method of claim 1, wherein the steps of receiving a set of barycentric parameters, computing a set of warped barycentric parameters, and blending the sets of warped barycentric parameters are repeated for a plurality of sets of barycentric parameters that define a plurality of points within the geometric object in world-space to produce a plurality of sets of parameters that define a plurality of sample vertices within the geometric object in screen-space.

3. The method of claim 2, wherein the plurality of sample vertices within the geometric object comprises vertices for one or more sub-polygons generated during a tessellation operation.

4. The method of claim 2, wherein the different points in the plurality of points are uniformly spaced relative to one another in world-space.

5. The method of claim 4, wherein the different sample vertices in the plurality of sample vertices appear uniformly spaced relative to one another in screen-space.

6. The method of claim 1, wherein the geometric object is a parametric quad patch that has four edges.

7. The method of claim 1, wherein four sets of warped barycentric parameters are generated for the set of barycentric parameters, and the step of blending comprises linearly blending the four sets of warped barycentric parameters.

8. A non-transitory computer-readable storage medium including instructions that, when executed by a processing unit, cause the processing unit to modify parameters to account for perspective foreshortening in tessellation operations, by performing the steps of:
    receiving a plurality of control points that define a geometric object having a plurality of edges;
    for each edge of the geometric object, computing a near target step size and a far target step size;
    for each edge of the geometric object, formulating a warp function based on the near target step size and the far target step size associated with the edge, wherein each warp function comprises a quadratic function;
    receiving a set of barycentric parameters defining a first point within the geometric object in world-space;
    for each edge of the geometric object, computing a set of warped barycentric parameters for the set of barycentric parameters based on the warp function associated with the edge; and
    blending the sets of warped barycentric parameters to produce a set of parameters that defines a sample vertex within the geometric object in screen-space.

9. The non-transitory computer-readable storage medium of claim 8, wherein the steps of receiving a set of barycentric parameters, computing a set of warped barycentric parameters, and blending the sets of warped barycentric parameters are repeated for a plurality of sets of barycentric parameters that define a plurality of points within the geometric object in world-space to produce a plurality of sets of parameters that define a plurality of sample vertices within the geometric object in screen-space.

10. The non-transitory computer-readable storage medium of claim 9, wherein the plurality of sample vertices within the geometric object comprises vertices for one or more sub-polygons generated during a tessellation operation.

11. The non-transitory computer-readable storage medium of claim 9, wherein the different points in the plurality of points are uniformly spaced relative to one another in world-space.

12. The non-transitory computer-readable storage medium of claim 11, wherein the different sample vertices in the plurality of sample vertices appear uniformly spaced relative to one another in screen-space.

13. The non-transitory computer-readable storage medium of claim 8, wherein the geometric object is a parametric quad patch that has four edges.

14. The non-transitory computer-readable storage medium of claim 8, wherein four sets of warped barycentric parameters are generated for the set of barycentric parameters, and the step of blending comprises linearly blending the four sets of warped barycentric parameters.

15. A computing device, comprising:
a processing unit configured to:
for each edge of a geometric object that has a plurality of edges and is defined by a plurality of control points, compute a near target step size and a far target step size;
for each edge of the geometric object, formulate a warp function based on the near target step size and the far target step size associated with the edge, wherein each warp function associated with a different edge of the geometric object comprises a quadratic function;
receive a set of barycentric parameters defining a first point within the geometric object in world-space;
for each edge of the geometric object, compute a set of warped barycentric parameters for the set of barycentric parameters based on the warp function associated with the edge; and
blend the sets of warped barycentric parameters to produce a set of parameters that defines a sample vertex within the geometric object in screen-space.

16. The computing device of claim 15, wherein the processing unit includes a parameter unit configured to generate the set of barycentric parameters.

17. The computing device of claim 15, wherein the processing unit is configured to linearly blend the sets of warped barycentric parameters to produce the set of parameters that defines the sample vertex within the geometric object in screen-space.

* * * * *